(12) United States Patent
Cunningham et al.

(10) Patent No.: US 11,379,455 B2
(45) Date of Patent: *Jul. 5, 2022

(54) SYSTEMS AND METHODS FOR SYNCHRONIZING DATABASE OPERATIONS WITH A DISTRIBUTED BLOCKCHAIN

(71) Applicant: Mythical, Inc., Sherman Oaks, CA (US)

(72) Inventors: Stephan Cunningham, Pasadena, CA (US); Cameron Thacker, Sherman Oaks, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/023,020

(22) Filed: Sep. 16, 2020

(65) Prior Publication Data

US 2020/0409928 A1 Dec. 31, 2020

Related U.S. Application Data

(63) Continuation of application No. 16/278,950, filed on Feb. 19, 2019, now Pat. No. 10,810,183.

(51) Int. Cl.
*G06F 16/23* (2019.01)
*G06F 16/27* (2019.01)
(Continued)

(52) U.S. Cl.
CPC ........ *G06F 16/2343* (2019.01); *G06F 16/219* (2019.01); *G06F 16/2379* (2019.01);
(Continued)

(58) Field of Classification Search
CPC .. G06F 16/2343; G06F 16/27; G06F 16/2379; G06F 16/219; H04L 9/0637;
(Continued)

(56) References Cited

U.S. PATENT DOCUMENTS

10,810,183 B1 10/2020 Cunningham
2018/0026979 A1 1/2018 Cox
(Continued)

*Primary Examiner* — Usmaan Saeed
*Assistant Examiner* — William P Bartlett
(74) *Attorney, Agent, or Firm* — Esplin & Associates, PC (57) ABSTRACT

Systems and methods for synchronizing database operations with a distributed blockchain are disclosed. The database operations are performed on a database that is shared between multiple users including a first user. Exemplary implementations may: receive database information reflecting one or more database operations performed by the first user on a first version of the database; verify whether the one or more database operations are allowed to be performed by the first user; record on the distributed blockchain, responsive to the verification being affirmative, a message that describes or refers to a description of one or more modifications to the database; effectuate transmissions of notifications to the first version of the database; subsequent to the transmissions, propagate or revert the one or more database operations, based on the verification result.

20 Claims, 4 Drawing Sheets

(51) Int. Cl.
*G06F 16/21* (2019.01)
*H04L 9/06* (2006.01)

(52) U.S. Cl.
CPC ............ *G06F 16/27* (2019.01); *H04L 9/0637* (2013.01); *H04L 2209/38* (2013.01)

(58) Field of Classification Search
CPC ... H04L 2209/38; H04L 9/3239; H04L 63/10; H04L 9/32
See application file for complete search history.

(56) References Cited

U.S. PATENT DOCUMENTS

| | | |
|---|---|---|
| 2018/0227119 A1 | 8/2018 | Bibera |
| 2018/0285839 A1 | 10/2018 | Yang |
| 2019/0081793 A1 | 3/2019 | Martino |
| 2019/0097807 A1 | 3/2019 | Mahanta |
| 2019/0158594 A1 | 5/2019 | Shadmon |
| 2019/0238525 A1* | 8/2019 | Padmanabhan ......... H04L 63/08 |
| 2019/0312792 A1* | 10/2019 | Srinivasan ............ H04L 9/3239 |
| 2020/0034353 A1 | 1/2020 | Innocenti |
| 2020/0133955 A1 | 4/2020 | Padmanabhan |
| 2020/0142992 A1* | 5/2020 | Ocher ............... G06F 16/24556 |
| 2020/0218823 A1 | 7/2020 | Mizrakhi |
| 2022/0019575 A1* | 1/2022 | Qian .................. G06F 16/2379 |

\* cited by examiner

|   | A | B | C | D |
|---|---|---|---|---|
| 1 | 0 | 0 | 0 | 0 |
| 2 | 0 | 0 | 0 | 0 |
| 3 | 0 | 0 | 0 | 0 |

↙ 31 *Fig. 3A*

|   | A | B | D |
|---|---|---|---|
| 1 | 0 | 0 | 0 |
| 2 | 0 | 0 | 0 |
| 3 | 0 | 0 | 0 |

↙ 32 *Fig. 3B*

|   | A | B | C | D |
|---|---|---|---|---|
| 1 | 1 | 0 | 0 | 0 |
| 2 | 0 | 0 | 0 | 0 |
| 3 | 0 | 0 | 0 | 0 |

↙ 41 *Fig. 4A*

|   | A | B | D |
|---|---|---|---|
| 1 | 0 | 0 | 0 |
| 2 | 0 | 0 | 0 |
| 3 | 0 | 0 | 0 |

↙ 42 *Fig. 4B*

|   | A | B | C | D |
|---|---|---|---|---|
| 1 | 1 | 0 | 0 | 0 |
| 2 | 0 | 0 | 0 | 0 |
| 3 | 0 | 0 | 0 | 0 |

↙ 51 *Fig. 5A*

|   | A | B | D |
|---|---|---|---|
| 1 | 1 | 0 | 0 |
| 2 | 0 | 0 | 0 |
| 3 | 0 | 0 | 2 |

SYSTEMS AND METHODS FOR SYNCHRONIZING DATABASE OPERATIONS WITH A DISTRIBUTED BLOCKCHAIN

FIELD OF THE DISCLOSURE

The present disclosure relates to systems and methods for synchronizing database operations with a distributed and/or decentralized blockchain, the database operations being performed on a database that is shared between multiple users. The blockchain stores a registry of assets and transactions.

BACKGROUND

Databases, in particular distributed databases, are known to facilitate storing, organizing, and sharing information for users, e.g., users in different physical locations.

Ledgers are known techniques to produce a secure record or registry of ownership of assets, transactions, and other information. For example, a blockchain is a type of ledger that can store a registry of assets and transactions. Blockchain technology is known to be used for cryptocurrencies, and/or other applications.

SUMMARY

One aspect of the present disclosure relates to a system configured for synchronizing database operations with a distributed blockchain, the database operations being performed on a database that is shared between multiple users. The multiple users may include a first user. The system may include one or more hardware processors configured by machine-readable instructions. The processor(s) may be configured to receive database information reflecting one or more database operations performed by the first user on a first version of the database. The one or more database operations may operate on one or more cells of the database. Responsive to performance of the one or more database operations, the one or more cells of the database have been locked to prevent the multiple users from making further modifications to the one or more cells of the database through other versions of the database. The processor(s) may be configured to verify whether the one or more database operations are allowed to be performed by the first user. The processor(s) may be configured to record on the distributed blockchain, responsive to the verification being affirmative, a message that describes or refers to a description of one or more modifications to the database. The one or more modifications may correspond to the one or more database operations. The processor(s) may be configured to effectuate transmission, responsive to the verification being affirmative, of a first notification to the first version of the database. Subsequent to transmission of the first notification, the one or more database operations may be propagated to the other versions of the database. The processor(s) may be configured to effectuate transmission, responsive to the verification being negative, of a second notification to the first version of the database. Subsequent to transmission of the second notification, the one or more database operations on the first version of the database may be reverted. The processor(s) may be configured to unlock the one or more cells of the database, subsequent to transmission of either the first notification or the second notification.

Another aspect of the present disclosure relates to a method for synchronizing database operations with a distributed blockchain, the database operations being performed on a database that is shared between multiple users. The multiple users may include a first user. The method may include receiving database information reflecting one or more database operations performed by the first user on a first version of the database. The one or more database operations may operate on one or more cells of the database. Responsive to performance of the one or more database operations, the one or more cells of the database have been locked to prevent the multiple users from making further modifications to the one or more cells of the database through other versions of the database. The method may include verifying whether the one or more database operations are allowed to be performed by the first user. The method may include recording on the distributed blockchain, responsive to the verification being affirmative, a message that describes or refers to a description of one or more modifications to the database. The one or more modifications correspond to the one or more database operations. The method may include effectuating transmission, responsive to the verification being affirmative, of a first notification to the first version of the database. Subsequent to transmission of the first notification, the one or more database operations may be propagated to the other versions of the database. The method may include effectuating transmission, responsive to the verification being negative, of a second notification to the first version of the database. Subsequent to transmission of the second notification, the one or more database operations on the first version of the database are may be reverted. The method may include unlocking the one or more cells of the database, subsequent to transmission of either the first notification or the second notification.

As used herein, any association (or relation, or reflection, or indication, or correspondency) involving servers, processors, client computing platforms, databases, blockchains, database operations, versions of a database, cells of a database, modifications, messages, notifications, encryptions, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
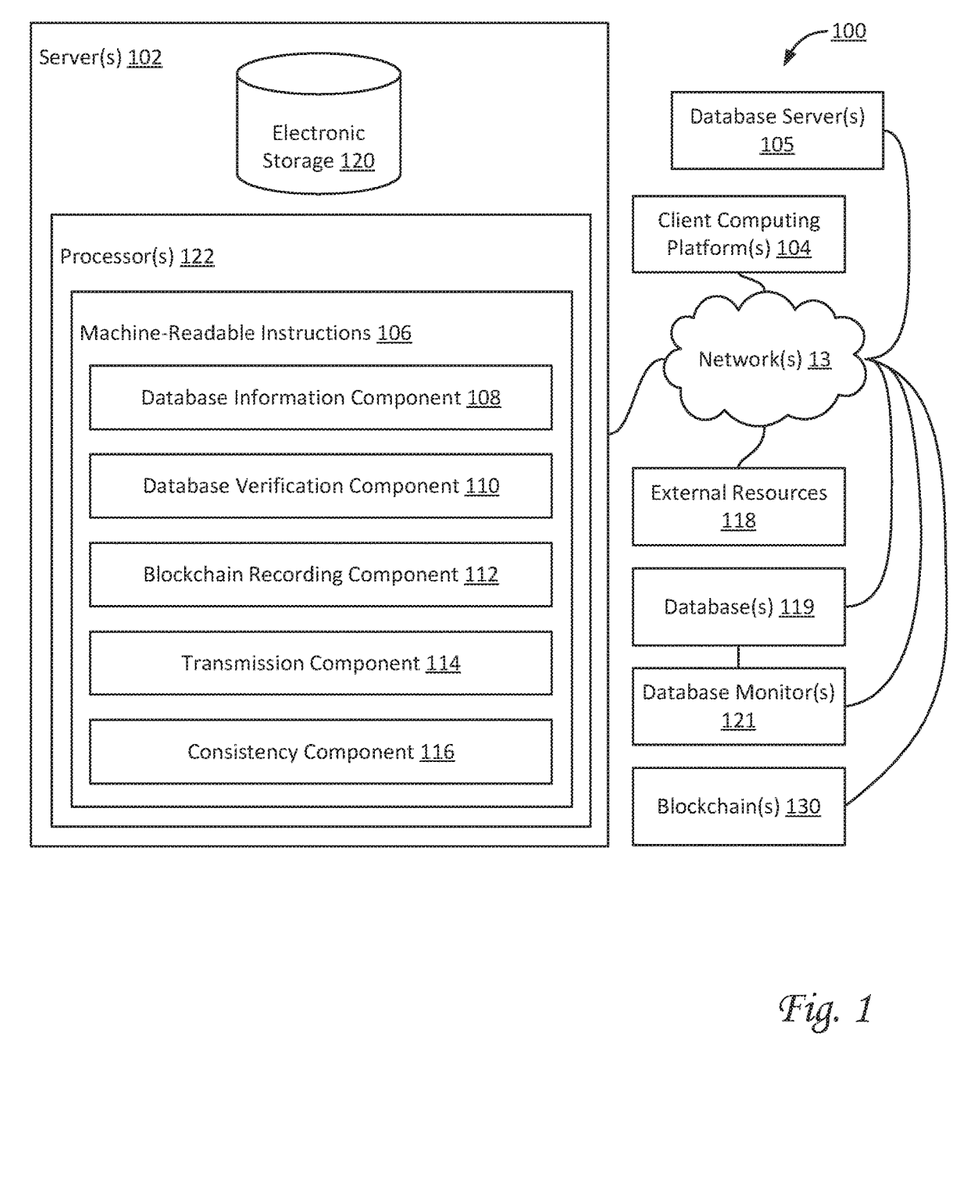
FIG. 1 illustrates a system configured for synchronizing database operations with a distributed blockchain, the database operations being performed on a database that is shared between multiple users, in accordance with one or more implementations.

FIG. 1 illustrates a system 100 configured for synchronizing database operations with a distributed blockchain, the database operations being performed on a database that is shared between multiple users, in accordance with one or more implementations. By storing information on the distributed blockchain about the performed database operations, analysis of the distributed blockchain may facilitate auditing (e.g., to determine which particular user made a particular change), database reconstruction, and/or other features related to analysis of the database. The multiple users may include a first user, a second user, a third user, a fourth user, and so forth. In some implementations, system 100 may include one or more servers 102, one or more database(s) 119, one or more database monitor(s) 121, one or more client computing platform(s) 104, one or more database server(s) 105, external resources 118, electronic storage 120, one or more blockchains 130, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. The multiple users may use different client computing platforms 104. For example, a first client computing platform 104 may be associated with the first user, a second client computing platform 104 may be associated with the second user, a third client computing platform 104 may be associated with the third user, the fourth client computing platform 104 may be associated with the fourth user, and so forth.

Figure 3A:
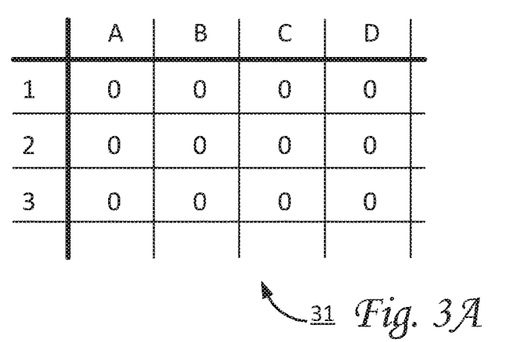
FIGS. 3A-3B, 4A-4B, and 5A-5B illustrate exemplary databases as may be used by a system configured for synchronizing database operations with a distributed blockchain, in accordance with use by one or more implementations.
Figure 3B:
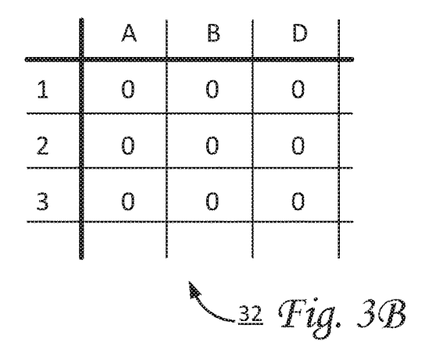

In some implementations, different users may access and/or otherwise use different versions of the same database. In some implementations, users may use different computing devices and/or platforms to access a database. Decentralized databases may facilitate sharing control and/or hosting responsibilities of information among different users, e.g., to prevent a single point of failure. For example, the first user may use a first local version of a particular database on a first client computing platform, the second user may use a second local version of the same particular database on a second client computing platform, and so forth. Different versions of the same database do not need to be identical. For example, the first version of the particular database may include proprietary and/or otherwise privileged information that is not accessible to the second user and/or the second version of the particular database. By way of non-limiting example, FIGS. 3A and 3B illustrate exemplary databases as may be used by system 100, in accordance with use by one or more implementations. FIG. 3A illustrates a first version 31 of a particular database, whereas FIG. 3B illustrates a second version 32 of the same database. As depicted in FIGS. 3A-3B, first version 31 includes a column labeled "C" that is not visible in second version 32, e.g., due to a limitation and/or restriction pertaining to the second user. As depicted, the other cells in either version of this particular database have the same contents of zeroes, at least initially. This is merely exemplary, and in no way limits the scope of this disclosure.

Referring to FIG. 1, server(s) 102 may be configured by machine-readable instructions 106. Machine-readable instructions 106 may include one or more instruction components. The instruction components may include computer program components. The instruction components may include one or more of database information component 108, database verification component 110, blockchain recording component 112, transmission component 114, consistency component 116, and/or other instruction components.

Database information component 108 may be configured to receive and/or obtain database information reflecting one or more database operations performed on one or more databases, including but not limited to database 119. As used herein, a database operation may include one or more of additions of information, insertions of information, modifications of information, (re-)location of information, replacement of information, removal of information, formatting of information, and/or other changes of information of a database, including but not limited to database 119. In some implementations, database information component 108 may be configured to receive and/or obtain database information reflecting one or more database operations performed on a first version of database 119, e.g., by the first user. In some implementations, database information component 108 may be configured to receive and/or obtain database information reflecting one or more database operations performed on a second version of database 119, e.g., by the second user. In some implementations, database information may be received from one or more client computing platforms 104. Alternatively, and/or simultaneously, in some implementations, database information may be received from database monitor 121, database server 105, one or more versions of database 119, and/or from other resources and/or components in system 100. For example, once a particular user performs a database operation on a particular version of database 119, the mechanisms and/or paths through which information about that activity reaches database information component 108 may vary by implementation. By way of non-limiting example, the first version of database 119 may notify database information component 108, e.g. through first client computing platform 104. In some implementations, database 119 may be managed and/or controlled from a centralized database server 105 (configured to host the database), which may in turn notify database information component 108. In some implementations, database 119 may be monitored by database monitor 121, which may in turn notify database information component 108.

Different databases may choose different approaches to propagating database operations from one version to other versions of the database. In some implementations, a particular database operation may be propagated conservatively, i.e., only after one or more types of verification have verified the integrity of the particular database operation. In some implementations, a particular database operation may be propagated opportunistically to other versions of the database, such that the process of reverting changes may be more elaborate than with conservative propagation. In some implementations, the type of propagation may vary with the type of the particular database operation. For example, certain types of deletions may warrant a more conservative approach than certain types of modifications of individual cell values.

Figure 4A:
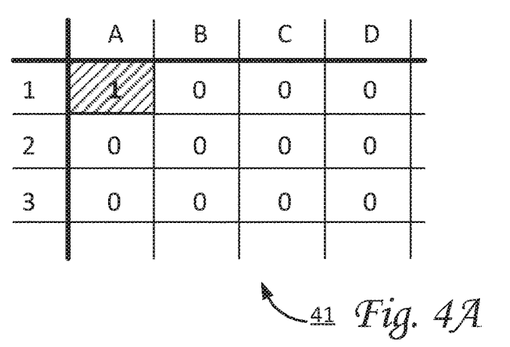
Figure 4B:
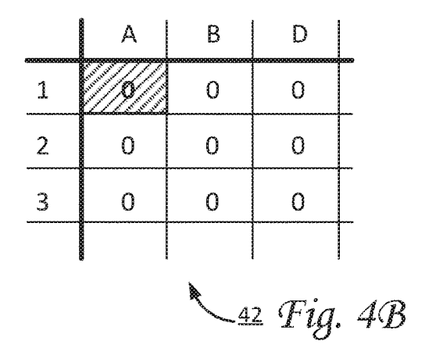

By way of non-limiting example, FIGS. 4A and 4B illustrate a first version 41 and a second version 42 of an exemplary database as may be used by system 100, in accordance with use by one or more implementations. First version 41 may be similar to first version 31 of FIG. 3A, and second version 42 may be similar to second version 32 of FIG. 3B. As depicted in FIG. 4A, the first user has performed one or more database operations on first version 41 of the database that resulted in a modification of cell A1 to the value "1". In other words, the one or more database operations performed by the first user operated on particular cells of the database, in this example cell A1. A database information component similar to or the same as database information component 108 (in FIG. 1) may receive particular database information that reflects the one or more performed database operations, or, in this case, the modification of cell A1.

Referring to FIG. 1, system 100 may be configured such that, responsive to performance of one or more particular database operations by a user (operating on one or more particular cells of a particular database), the one or more particular cells of the particular database are locked, e.g., to prevent one or more users from making modifications to the one or more particular cells. For example, responsive to the first user performing database operations, one or more cells of database 119 may be locked to prevent the second user from making modifications to the one or more cells. By way of non-limiting example, FIGS. 4A and 4B illustrate first version 41 and second version 42 of an exemplary database as may be used by system 100, in accordance with use by one or more implementations. As depicted in FIG. 4A, the first user has modified cell A1, and this cell has been locked (indicated by a pattern in the cell) to prevent further modifications. As depicted in FIG. 4B, the same cell, A1, has been locked to prevent the second user from making modifications to this cell.

Referring to FIG. 1, database verification component 110 may be configured to verify whether database operations are allowed to be performed by particular users. In particular, database verification component 110 may be configured to verify whether the one or more database operations performed by the first user on database 119 are allowed to be performed (by any user, and by the first user specifically). For example, part of a database may be read-only, or may require certain permissions to be modified. Alternatively, and/or simultaneously, part of a database may only be modified in limited ways, such as a cell that must have a numerical value, or be in a certain range, and/or may otherwise be restricted in terms of the types of database operations and/or modifications are allowed to be performed.

In some implementations, verifying whether one or more database operations are allowed to be performed (e.g., by the first user) may include verifying whether the particular user has permission to modify the one or more cells of the database (e.g., database 119). In some implementations, verifying whether one or more database operations are allowed to be performed by a particular user may include verifying whether the one or more cells of the database (e.g., database 119) had been locked prior to the one or more database operations performed by the particular user. For example, the one or more cells of a database may have been locked by database server 105 (and/or by another component of system 100) to prevent the multiple users from making further modifications to the one or more cells of the database through other versions of the database. For example, the one or more cells of a database have been locked to prevent the second user from making modifications to cells of the second version of database 119 that correspond to the one or more cells of database 119 that have been locked.

Blockchain recording component 112 may be configured to record messages and/or other information on one or more blockchains, including but not limited to one or more blockchains 130. In some implementations, blockchain recording component 112 may be configured to record messages and/or other information on a distributed blockchain. As used herein, the term "distributed" refers to multiple computing platforms located in multiple separate and distinct geographical locations operating together to provide particular functionality, such as, in this case, the functionality of a blockchain.

In some implementations, blockchain 130 (e.g., a distributed blockchain) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of blockchain 130. The smart contracts may be stored on blockchain 130. In some implementations, the distributed computing platform may be Ethereum. In some implementations, the virtual machine may be a Turing-complete and decentralized virtual machine.

Blockchain 130 may store a registry of assets and transactions across one or more networks. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights. Tokens are a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 130.

In some implementations, blockchain 130 may record ownership of assets. Alternatively, and/or simultaneously, blockchain 130 may record transactions that modify ownership of assets. A smart contract may be a type of asset. In some implementations, once a smart contract has been added to blockchain 130, the smart contract may be referred to as published, posted, and/or recorded. In some implementations, elements of blockchain 130 may be grouped together in units that are referred to as blocks. Individual blocks may be linked or chained together to form a structure of blocks, such as, e.g., a chain of blocks. An individual block may include one or more assets and one or more transactions.

In some implementations, blockchain 130 may be publicly accessible and append-only. In some implementations, existing blocks of blockchain 130 can substantially not be altered or deleted, unless multiple copies of blockchain 130 are altered. This is unlikely to happen provided that the multiple copies are stored on different computing platforms, e.g., in different geographical locations. Blockchain 130 may be replicated, in part or in its entirety, on multiple computing platforms, preferably in multiple different geographical locations.

Blockchain recording component 112 may be configured to record one or more messages on blockchain 130, responsive to verification by database verification component 110 being affirmative. A message may describe or refer to a description of one or more modifications to database 119. The one or more modifications may correspond to the one or more database operations performed by a particular user, e.g., by the first user. In some implementations, the message may be encrypted. In some implementations, the one or more modifications to database 119 may be encrypted. For example, referring to FIG. 4A, a particular message may describe a modification of cell A1 of a database (e.g., database 119). In some implementations, messages from blockchain recording component 112 may be recorded as assets on blockchain 130. Alternatively, and/or simultaneously, in some implementations, messages from blockchain recording component 112 may be recorded as transactions on blockchain 130. Alternatively, and/or simultaneously, in some implementations, messages from blockchain recording component 112 may be recorded through smart contracts on blockchain 130, e.g., as functions of one or more smart contracts. Other implementations to record information on blockchain 130 are envisioned within the scope of this disclosure.

Figure 6:
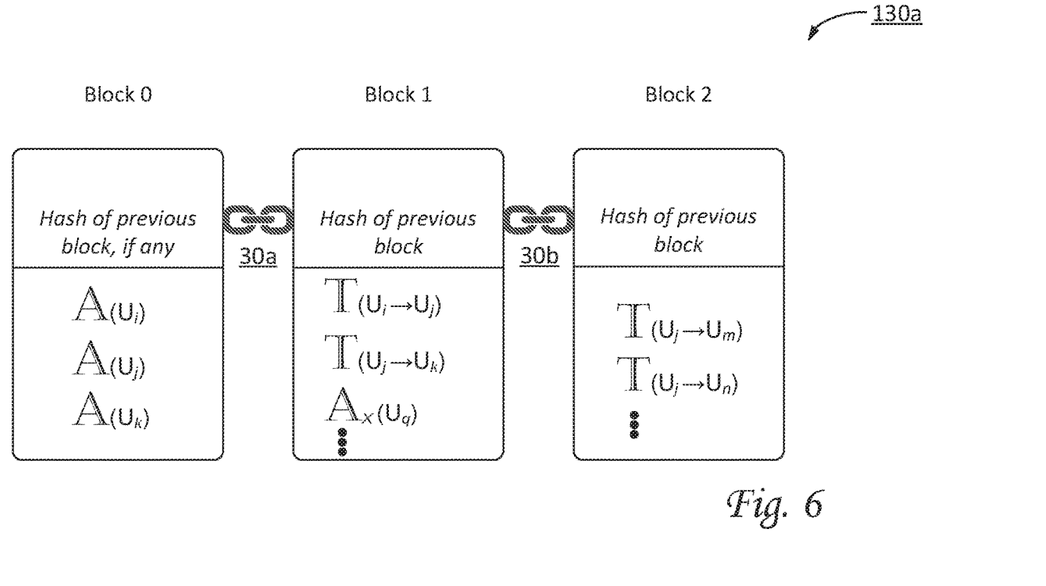
FIGS. 6 and 7 illustrate exemplary blockchains, in accordance with use by one or more implementations.

By way of non-limiting example, FIG. 6 illustrates a blockchain 130a (similar to or the same as blockchain 130 in FIG. 1) that includes a block 0, a block 1, and a block 2. As time progresses, more blocks may be added to blockchain 130a. The blocks within blockchain 130a are ordered. In block 0, three assets (indicated by a capital "A") are generated and/or assigned to three users or participants: a first asset is assigned to user i (Ui), a second asset is assigned to user j (Uj), and a third asset is assigned to user k (Uk). Block 1 is connected to block 0 (as indicated by a link 30a), for example by including an address of block 1 in block 0, or vice versa. Likewise, block 1 is connected to block 2, as indicated by a link 30b.

In block 1, one asset (labeled Ax) is generated and/or assigned to user q (Uq). For example, the asset in block 1 may be a connection or link to a particular database, e.g., database 119 in FIG. 1. Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 130a may determine the current assets of blockchain 130a and/or the current state of database 119 (e.g., through asset Ax). In some implementations, the balance of a particular user may be verified prior to adding a transaction that reduces that particular user's balance. For example, an individual user may not be allowed to transfer more assets than the individual user owns.

Figure 7:
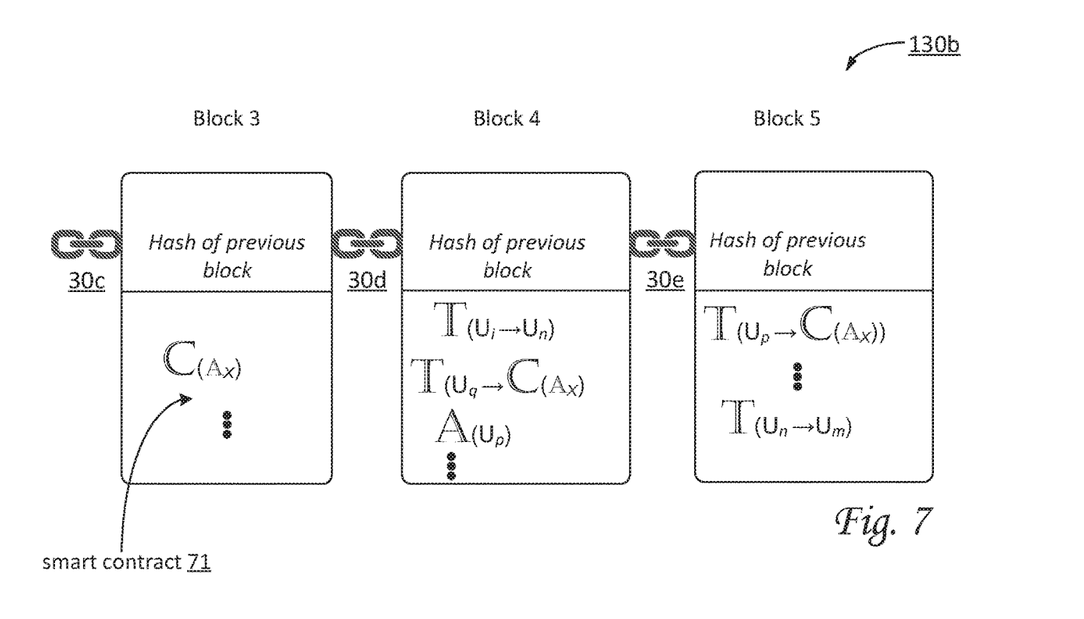

By way of non-limiting example, FIG. 7 illustrates a blockchain 130b (similar to or the same as blockchain 130 in FIG. 1) that includes the same blocks as blockchain 130a of FIG. 6, plus additional blocks (block 3, block 4, block 5) that have been appended to the blockchain. Block 3 may be connected to block 2 (as indicated by a link 30c), block 4 may be connected to block 3 (as indicated by a link 30d), and block 5 may be connected to block 4 (as indicated by a link 30e). In block 3, a smart contract 71 (indicated by a capital "C") is posted. For example, smart contract 71 may have been generated to implement a set of code defining functions related to asset Ax. In particular, different functions included in smart contract 71 may correspond to different modifications of database 119 (not depicted in FIG. 7) and/or different database operations performed by a particular user. In FIG. 7, a function call to an individual function defined by a given set of code (in smart contract 71) may be depicted and/or implemented as a transaction on blockchain 130b. Smart contract 71 may have been posted by a component of system 100 (shown in FIG. 1). In block 4, one asset is generated and/or assigned to user p (Up). Additionally, block 4 includes a transaction (indicated by a capital "T"): a transaction from user i to user n. For example, the transaction may represent a purchase of a first virtual item by user n. Additionally, Block 4 includes a transaction from user q to the same smart contract (smart contract 71) as depicted in block 3. For example, user q may be the first user as discussed in relation to FIG. 4A. For example, the transaction may represent a modification by user q of cell A1 of database 119. Block 5 includes two transactions (indicated by a capital "T"): a first transaction from user p to the same smart contract (smart contract 71) as depicted in block 3, and a second transaction from user n to user m. For example, the first transaction in block 5 may represent user p performing a particular database operation to database 119. For example, user q may be the second user as discussed elsewhere in relation to FIG. 5B, and the particular database operation may have resulted in a modification and locking of cell D3. The second transaction in block 5 may represent a purchase of a particular virtual item from user n (Un) by user m (Um).

Referring to FIG. 1, transmission component 114 may be configured to effectuate transmissions of notifications to components of system 100, database 119, database server 105, and/or other elements depicted in FIG. 1. In some implementations, transmission component 114 may be configured to effectuate, responsive to verification by database verification component 110 being affirmative, a first notification to one or more versions of database 119 (e.g., to the first version of database 119), and/or to other elements depicted in FIG. 1. In some implementations, subsequent to transmission of the first notification, one or more database operations may be propagated to other versions of database 119. In some implementations, subsequent to transmission of the first notification, one or more modifications of cells may be propagated to other versions of database 119. For example, responsive to verification by database verification component 110 that a particular database operation by the first user (on a first version of database 119) is allowed, transmission component 114 may be configured to transmit one or more particular notifications. In some implementations, the one or more particular notifications may effectuate propagation of the particular database operation and/or particular modifications of one or more cells of database 119 to other versions of database 119, in particular the second version of database 119. In some implementations, propagation of a modification of database cells may be accompanied by one or more messages being recorded on blockchain 130. For example, the propagation of the modification of cell A1 (based on a database operation by the first user) may be accompanied by recording the transaction from user q in block 4 of blockchain 130b in FIG. 7.

Figure 5A:
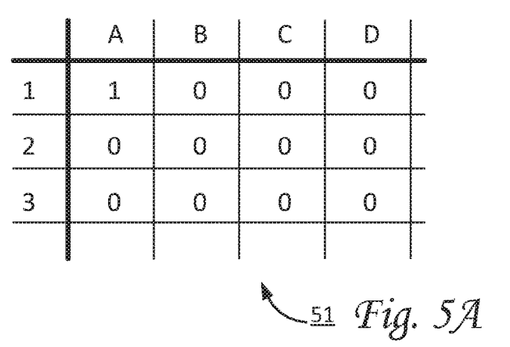
Figure 5B:
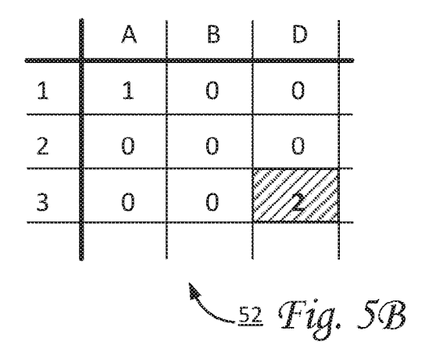

Referring to FIG. 1, in some implementations, the one or more particular notifications may effectuate unlocking of locked cells in some or all versions of database 119. For example, subsequent to the transmission of one or more particular notifications, cells of the first and second version of database 119 may be unlocked. For example, FIG. 5A illustrates a first version 51 of an exemplary database as may be used by system 100, in accordance with use by one or more implementations. First version 51 may be similar to first version 41 of FIG. 4A. As depicted in FIG. 5A, the one or more database operations performed by the first user on first version 41 of the database (in FIG. 4A) have been verified by a database verification component similar to or the same as database verification component 110 (in FIG. 1), one or more notifications have been transmitted by a transmission component similar to or the same as transmission component 114, and subsequently cell A1 of first version 51 of database 119 has been unlocked (indicated by the lack of a pattern in cell A1). Additionally, as illustrated by second version 52 of database 119 in FIG. 5B (which may be similar to second version 42 in FIG. 4B), the particular one or more database operations performed on cell A1 in first version 51 (FIG. 5A) are propagated to second version 52 of database 119 in FIG. 5B, effectuating a similar change from 0 to 1 in cell A1. Moreover, cell A1 of second version 52 of database 119 in FIG. 5B has been unlocked (indicated by the lack of a pattern in cell A1). FIG. 5B furthermore depicts that the second user has performed one or more database operations on second version 52 of database 119 that resulted in a modification of cell D3 to the value "2". In other words, the one or more database operations performed by the second user operated on particular cells of database 119 (here, cell D3), which were subsequently locked. Successful verification of these database operations may subsequently lead to propagation to other versions, unlocking of the pertinent cells, and recording of a message by blockchain recording component 112, such as, for example, the first transaction in block 5 of blockchain 130b in FIG. 7. In some implementations, the messages and/or other information recorded on blockchain 130 may be sufficient to (re)construct the current state of database 119. In some implementations, database operations that are not allowed and/or otherwise reverted may not need to be recorded on blockchain 130. In some implementations, all database operations may be recorded on blockchain 130. In some implementations, recorded database operations that have subsequently been reverted may need to be removed and/or reverted from blockchain 130 and/or otherwise modified such that a reconstructed database based on the recorded information on blockchain 130 is consistent with database 119. In other words, a particular database operation may need to be reverted on one or more versions of database 119 and/or reverted from blockchain 130. Reversion for append-only blockchains may be implemented as a modification that effectively undoes the particular database operation.

Referring to FIG. 1, transmission component 114 may be configured to effectuate transmissions of one or more notifications responsive to verification by database verification component 110 being negative and/or otherwise failing. In such a case, one or more particular database operations as performed were not allowed. Accordingly, the one or more particular database operations may be reverted. In some implementations, regardless of the verification results by database verification component 110, locked cells (i.e., cells that are related to the verification) may be unlocked. In other words, in some implementations, the changes to the cells may be propagated only if the corresponding database operations were allowed, and may be reverted if the corresponding database operations were not allowed.

In some implementations, consistency component 116 may be configured to lock and/or unlock cells of databases, including but not limited to database 119. For example, consistency component 116 may be configured to lock particular cells of database 119 subsequent to performance of database operations that operate on the particular cells. For example, consistency component 116 may be configured to unlock particular cells of database 119 subsequent to the database operations being propagated and/or reverted. In some implementations, consistency component 116 may be configured to unlock particular cells subsequent to one or more transmission by transmission component 114. For example, the particular cells may be unlocked subsequent to transmission of the first notification, the second notification, and/or other notifications.

In some implementations, server(s) 102, client computing platform(s) 104, and/or external resources 118 may be operatively linked via one or more electronic communication links. For example, such electronic communication links may be established, at least in part, via one or more network 13 such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, 112, 114, and/or 116, and/or other components. Processor(s) 122 may be configured to execute components 108, 110, 112, 114, and/or 116, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 122 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 122 may be configured to execute one or more additional components that may perform some or all of the functionality attributed below to one of components 108, 110, 112, 114, and/or 116.

Figure 2:
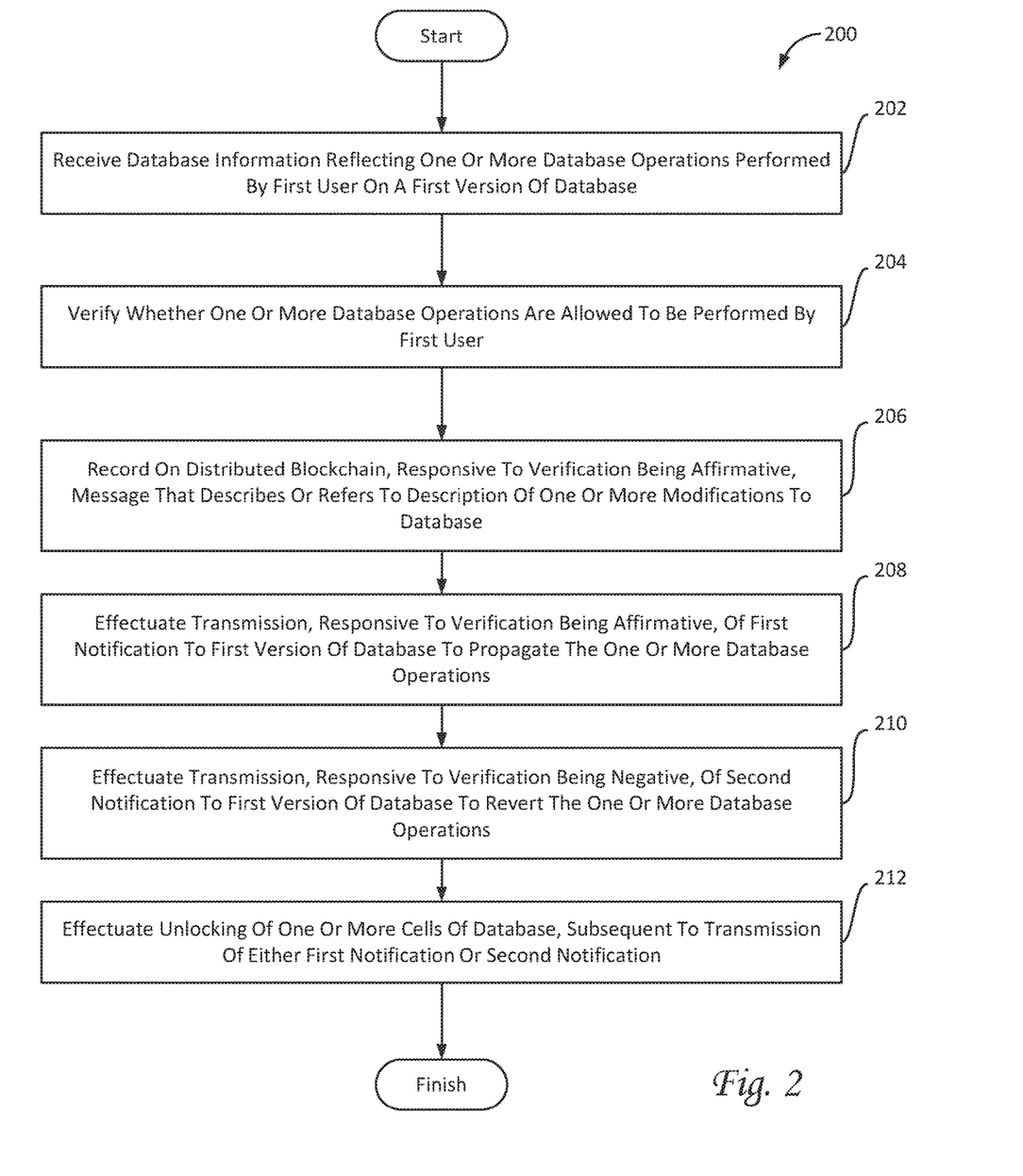
FIG. 2 illustrates a method for synchronizing database operations with a distributed blockchain, the database operations being performed on a database that is shared between multiple users, in accordance with one or more implementations.

FIG. 2 illustrates a method 200 for synchronizing database operations with a distributed blockchain, the database operations being performed on a database that is shared between multiple users, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving database information reflecting one or more database operations performed by the first user on a first version of the database. The one or more database operations may operate on one or more cells of the database. In some implementations, responsive to performance of the one or more database operations, the one or more cells of the database have been locked to prevent the multiple users from making further modifications to the one or more cells of the database, e.g., through other versions of the database. Operation 202 may be performed by one or more hardware processors configured by machine-readable instructions including a component that is the same as or similar to database information component 108, in accordance with one or more implementations.

An operation 204 may include verifying whether the one or more database operations are allowed to be performed by the first user. Operation 204 may be performed by one or more hardware processors configured by machine-readable instructions including a component that is the same as or similar to database verification component 110, in accordance with one or more implementations.

An operation 206 may include recording on the distributed blockchain, responsive to the verification being affirmative, a message that describes or refers to a description of one or more modifications to the database. The one or more modifications correspond to the one or more database operations. Operation 206 may be performed by one or more hardware processors configured by machine-readable instructions including a component that is the same as or similar to blockchain recording component 112, in accordance with one or more implementations.

An operation 208 may include effectuating transmission, responsive to the verification being affirmative, of a first notification, e.g., to the first version of the database. Subsequent to transmission of the first notification, the one or more database operations may be propagated to other versions of the database. Operation 208 may be performed by one or more hardware processors configured by machine-readable instructions including a component that is the same as or similar to transmission component 114, in accordance with one or more implementations.

An operation 210 may include effectuating transmission, responsive to the verification being negative, of a second notification, e.g., to the first version of the database. Subsequent to transmission of the second notification, the one or more database operations on the first version of the database may be reverted. Operation 210 may be performed by one or more hardware processors configured by machine-readable instructions including a component that is the same as or similar to transmission component 114, in accordance with one or more implementations.

In some implementations, an operation 212 may include effectuating unlocking of the one or more cells of the database, subsequent to transmission of either the first notification or the second notification. Operation 212 may be performed by one or more hardware processors configured by machine-readable instructions including a component that is the same as or similar to consistency component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for synchronizing database operations with a distributed blockchain, the database operations being performed on a database that is hosted on one or more database servers that are accessible by multiple users including a first user and a second user, the system comprising:

a database server configured to host the database, wherein the database server is accessible by the first user through a first client computing platform and by the second user through a second client computing platform, wherein the database server is further configured to receive notifications and propagate database operations to different local versions of the database, wherein the different local versions include a first local version of the database and a second local version of the database, wherein the first local version of the database is accessible by the first user through the first client computing platform and not accessible by the second user, and wherein the second local version of the database is accessible by the second user through the second client computing platform and not accessible by the first user; and one or more hardware processors configured by machine-readable instructions to:

receive, from the first client computing platform, a first set of database information reflecting a first set of one or more database operations performed locally by the first user on the first local version of the database, wherein the first set of one or more database operations effectuates changes to a first set of one or more cells of the first local version of the database;

receive, from the second client computing platform, a second set of database information reflecting a second set of one or more database operations performed locally by the second user on the second local version of the database, wherein the second set of one or more database operations effectuates changes to a second set of one or more cells of the second local version of the database, wherein the second set of one or more cells of the second local version of the database is different from the first set of one or more cells of the first local version of the database;

record on the distributed blockchain a first message, wherein the first message describes or refers to a description of a first set of one or more modifications to the database, wherein the first set of one or more modifications corresponds to the first set of one or more database operations;

record on the distributed blockchain a second message, wherein the second message describes or refers to a second description of a second set of one or more modifications to the database, wherein the second set of one or more modifications corresponds to the second set of one or more database operations;

perform a first verification whether the first set of one or more database operations is allowed to be performed by the first user;

perform a second verification whether the second set of one or more database operations is allowed to be performed by the second user;

effectuate transmission to the database server, responsive to the first verification verifying the first user is allowed to perform the first set of one or more database operations, of a first notification, wherein, subsequent to receipt by the database server of the first notification, the first set of one or more database operations is propagated to the second local version of the database, such that the second local version of the database, upon being accessed by the second user, reflects that the first set of one or more database operations has been performed on the second local version of the database;

record on the distributed blockchain a third message, responsive to the second verification verifying the second user is not allowed to perform the second set of one or more database operations, wherein the third message describes or refers to a third description of a third set of one or more modifications to the database, wherein the third set of one or more modifications to the database reverts the changes to the second set of one or more cells of the second local version of the database, that were due to the second set of one or more modifications to the database, as previously recorded through the second message; and effectuate transmission to the database server, responsive to the second verification verifying the second user is not allowed to perform the second set of one or more database operations, of a second notification, wherein, subsequent to receipt by the database server of the second notification, the second set of one or more database operations on the second local version of the database is reverted such that the second local version of the database no longer includes the changes to the second set of one or more cells of the second local version of the database, and wherein the second set of one or more database operations is not propagated to the first local version of the database, such that the first local version of the database, upon being accessed by the first user, reflects that the second set of one or more database operations has not been performed on the first local version of the database.

2. The system of claim 1, wherein the one or more hardware processors are further configured by the machine-readable instructions to:
responsive to receipt of the first set of database information reflecting performance of the first set of one or more database operations, effectuate locking the first set of one or more cells of the first local version of the database to prevent the first user from making further modifications to the first set of one or more cells of the first local version of the database; and
effectuate unlocking of the first set of one or more cells of the the first local version of the database, subsequent to transmission of the first notification to the database server such that the first user is able to perform database operations locally on the first set of one or more cells of the first local version of the database.

3. The system of claim 1, wherein performing the first verification includes verifying whether the first user has permission to modify the first set of one or more cells of the first local version of the database.

4. The system of claim 1, wherein performing the first verification includes verifying whether the first set of one or more cells of the first local version of the database had been locked prior to the first set of one or more database operations performed locally by the first user on the first local version of the database.

5. The system of claim 1, wherein the first message is encrypted.

6. The system of claim 1, wherein the one or more hardware processors are further configured by the machine-readable instructions to:
reconstruct a reconstructed database based on messages recorded on the distributed blockchain.

7. The system of claim 6, wherein the reconstructed database is reconstructed such that:
(i) subsequent to recording the first message, the reconstructed database is consistent with the database hosted by the database server, including the first set of one or more database operations.

8. The system of claim 7, wherein the reconstructed database is further reconstructed such that:
(ii) subsequent to recording the second message, the reconstructed database is consistent with the database hosted by the database server, including the second set of one or more database operations.

9. The system of claim 8, wherein the reconstructed database is further reconstructed such that:
(iii) subsequent to recording the third message, the reconstructed database is consistent with the database hosted by the database server, such that the reconstructed database no longer includes the changes to the second set of one or more cells of the second local version of the database.

10. The system of claim 1, wherein the distributed blockchain is an append-only blockchain.

11. A method for synchronizing database operations with a distributed blockchain, the database operations being performed on a database that is hosted on one or more database servers that are accessible by multiple users including a first user and a second user, the method comprising:
hosting the database, by a database server, wherein the database server is accessible by the first user through a first client computing platform and by the second user through a second client computing platform, wherein the database server receives notifications and propagates database operations to different local versions of the database, wherein the different local versions include a first local version of the database and a second local version of the database, wherein the first local version of the database is accessible by the first user through the first client computing platform and not accessible by the second user, and wherein the second local version of the database is accessible by the second user through the second client computing platform and not accessible by the first user;
receiving, from the first client computing platform, a first set of database information reflecting a first set of one or more database operations performed by the first user on the first local version of the database, wherein the first set of one or more database operations operates on a first set of one or more cells of the first local version of the database;
receiving, from the second client computing platform, a second set of database information reflecting a second set of one or more database operations performed by the second user on the second local version of the database, wherein the second set of one or more database operations effectuates changes to a second set of one or more cells of the second local version of the database, wherein the second set of one or more cells of the second local version of the database is different from the first set of one or more cells of the first local version of the database;
recording on the distributed blockchain a first message, wherein the first message describes or refers to a description of a first set of one or more modifications to the database, wherein the first set of one or more modifications corresponds to the first set of one or more database operations;
recording on the distributed blockchain a second message, wherein the second message describes or refers to a second description of a second set of one or more modifications to the database, wherein the second set of one or more modifications corresponds to the second set of one or more database operations;
performing a first verification whether the first set of one or more database operations is allowed to be performed by the first user;
performing a second verification whether the second set of one or more database operations is allowed to be performed by the second user;
effectuating transmission to the database server, responsive to the first verification verifying the first user is allowed to perform the first set of one or more database operations, of a first notification, wherein, subsequent to receipt by the database server of the first notification, the first set of one or more database operations is propagated to the second local version of the database, such that the second local version of the database, upon being accessed by the second user, reflects that the first set of one or more database operations has been performed on the second local version of the database;
recording on the distributed blockchain a third message, responsive to the second verification verifying the second user is not allowed to perform the second set of one or more database operations, wherein the third message describes or refers to a third description of a third set of one or more modifications to the database, wherein the third set of one or more modifications to the database reverts the changes to the second set of one or more cells of the second local version of the database, that were due to the second set of one or more modifications to the database, as previously recorded through the second message; and effectuating transmission to the database server, responsive to the second verification verifying the second user is not allowed to perform the second set of one or more database operations, of a second notification, wherein, subsequent to receipt by the database server of the second notification, the second set of one or more database operations on the second local version of the database is reverted such that the second local version of the database no longer includes the changes to the second set of one or more cells of the second local version of the database, and wherein the second set of one or more database operations is not propagated to the first local version of the database, such that the first local version of the database, upon being accessed by the first user, reflects that the second set of one or more database operations has not been performed on the first local version of the database.

12. The method of claim 11, further comprising:

responsive to receiving the first set of database information reflecting performance of the first set of one or more database operations, effectuating locking the first set of one or more cells of the first local version of the database to prevent the first user from making further modifications to the first set of one or more cells of the first local version of the database; and effectuating unlocking of the first set of one or more cells of the first local version of the database, subsequent to transmission of the first notification to the database server such that the first user is able to perform database operations locally on the first set of one or more cells of the first local version of the database.

13. The method of claim 11, wherein performing the first verification includes verifying whether the first user has permission to modify the first set of one or more cells of the first local version of the database.

14. The method of claim 11, wherein performing the first verification includes verifying whether the first set of one or more cells of the first local version of the database had been locked prior to the first set of one or more database operations performed by the first user on the first local version of the database.

15. The method of claim 11, wherein the first message is encrypted.

16. The method of claim 11, further comprising:

reconstructing a reconstructed database based on messages recorded on the distributed blockchain.

17. The method of claim 16, wherein the reconstructed database is reconstructed such that:

(i) subsequent to recording the first message, the reconstructed database is consistent with the database hosted by the database server, including the first set of one or more database operations.

18. The method of claim 17, wherein the reconstructed database is further reconstructed such that:

(ii) subsequent to recording the second message, the reconstructed database is consistent with the database hosted by the database server, including the second set of one or more database operations.

19. The method of claim 18, wherein the reconstructed database is further reconstructed such that:

(iii) subsequent to recording the third message, the reconstructed database is consistent with the database hosted by the database server, such that the reconstructed database no longer includes the changes to the second set of one or more cells of the second local version of the database.

20. The method of claim 11, wherein the distributed blockchain is an append-only blockchain.

* * * * *